May 1, 1928.  
A. LANZ  
1,668,536  
FLEXIBLE COUPLING  
Filed May 19, 1927
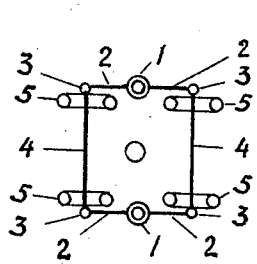 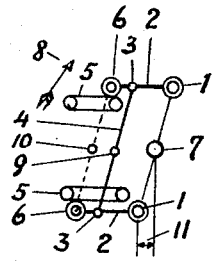 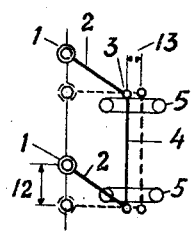 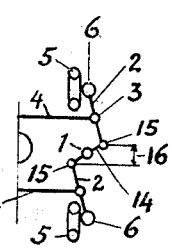
Fig. 1.   Fig. 2.   Fig. 3.   Fig. 4.
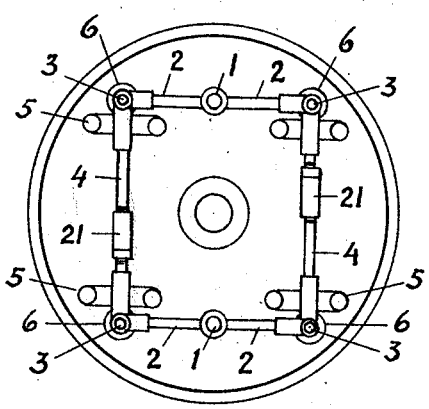 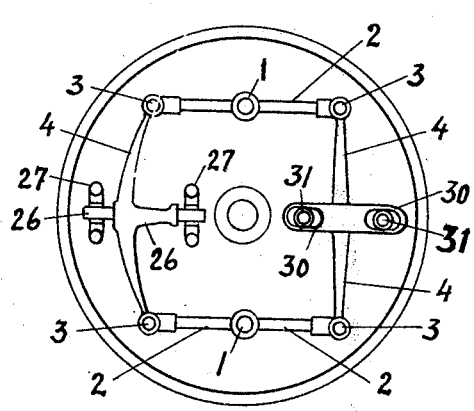
Fig. 5.   Fig. 9.
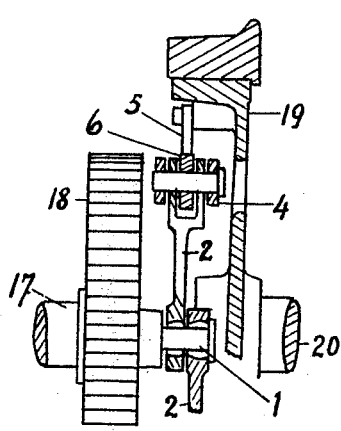 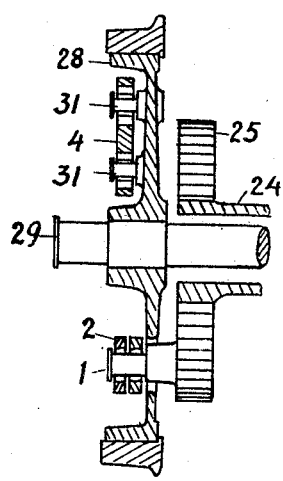 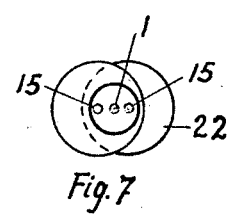
Fig. 7.
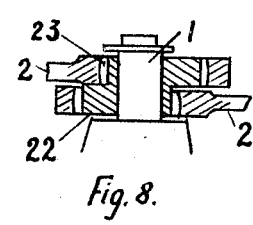
Fig. 6.   Fig. 10.   Fig. 8.
Inventor:  
Arthur Lanz.

Patented May 1, 1928.

1,668,536

UNITED STATES PATENT OFFICE.

ARTHUR LANZ, OF OERLIKON, SWITZERLAND.

FLEXIBLE COUPLING.

Application filed May 19, 1927. Serial No. 192,746.

My invention relates to flexible couplings particularly adapted to connect shafts out of line, moving with its supporting bearings to and from a limited eccentric position. The object of my invention is to provide suitable coupling means allowing revolving shafts to oscillate against each other in a straight line in any direction without causing any differences in circumferential speed between driving and driven shafts resulting from the coupling details, to prevent harmful backlashes and its resulting vibrations, to equalize inaccuracies in details, to provide flexible means to reduce undue strains from rotating masses, shocks and overloads.

To attain these objects one shaft carries a coupling member with about diagonal opposite driving means, preferably driving pins. One or more pair of parallel driving rods are provided, having the ends of one side swiveled on said driving pins and having a connection pivotally inserted between the other ends. Each pair of driving rods and its connection form together a driving frame revolving with said driving pins. The driving frame is adapted to slidably engage and to drive coupling members secured to and revolving with the other shaft.

While the coupling may be used for a great variety of purposes it is specially suitable in electric locomotives, for the power transmission between a driving and a driven coupling member, whereby the driving coupling member is supported and oscillating with a main frame and the driven coupling member is exposed to the inequalities of the tracks.

It is the object of my invention to transmit the circumferential speed of the two shafts correctly, to obtain but a small backlash, to provide a well balanced power transmission and to have an efficient equalizer against shocks and overloads. Additional objects of the invention will appear in the following specifications in which some of the preferred forms of my invention are described.

Referring to the drawing in which similar reference characters indicate the same parts in the several figures of the drawing, Fig. 1 is a diagrammatic outline arrangement of the coupling; Fig. 2 shows a diagrammatic outline of one driving frame to explain the working manner of the coupling; Fig. 3 is a diagrammatic outline of a driving frame to explain the working manner of the coupling during oscillations of the shafts; Fig. 4 shows a diagrammatic outline of one half of two driving frames with an equalizer; Fig. 5 is an end view of a preferred form of my coupling; Fig. 6 is a partial cross section through coupling shown in Fig. 5; Figs. 7 and 8 show a preferred form of an equalizer; Fig. 9 is an end view of another preferred form of my coupling; Fig. 10 is a partial cross section through coupling shown in Fig. 9.

Referring now to Fig. 1 a coupling member secured to one shaft but not shown in the figure carries two opposite crank pins 1. Two pair of driving rods 2 are swiveled with one end on the driving pins 1. Inserted between the other ends of each pair of driving rods 2 is a connection 4. Each pair of rods 2 and its connection 4 forms a driving frame, revolving with said one shaft. The driving frames preferably with ends 3 of the driving rods 2 engage slidably guides 5 fastened to and revolving with a coupling member secured to the other shaft.

In Fig. 2 one driving frame only is shown. Its driving rods 2 have an extension to carry rollers 6 bearing slidably against guides 5. The driving and the driven shafts are in a concentric position 7. Between rollers 6 and guides 5 is a certain running fit, a small play. Driving now with pins 1 on centre 7 in the direction of arrow 8 the connection 4 rotates on a virtual centre 9 and rollers 6 on an imaginary centre 10 until the rollers have closed up tight to guides 5. By this time the shaft carrying the driving frame has rotated for a distance 11. With rollers 6 tight, one driving rod of the driving frame pulls and the other rod pushes its respective guide 5 secured to the driven shaft. By the grip of rollers 6 revolving with the driving shaft, guides 5 secured to the driven shaft are seized and forced to revolve at the same speed.

In Fig. 3 one driving frame is shown, in the dotted position for concentric shafts, in full lines for the two shafts set at an eccentricity of a distance 12. If the one shaft with pins 1 and driving frame 2, 4, 2 oscillates parallel to guides 5, ends 3 of the driving rods move along guides 5, the driving frame maintains its form exactly. In oscillations in any other direction the driving frame changes its shape. For an eccentricity of distance 12 this change is shown in dotted and full lines. Ends 3 of the driving frame move along guides 5 a distance 13. With every revolution this distance increases and decreases twice from zero to a maximum. The maximum is reached with the eccentricity at 90 degrees to the guides as shown in Fig. 3. The position of the coupling members on the shafts remains the same throughout the oscillation. It is a special advantage of my couplings that in oscillations of the shafts the coupling details do not cause any changes in the circumferential speed of the shafts.

For a balanced drive at least two driving frames are required. Fig. 4 shows in a diagrammatic form half of two driving frames with an equalizer. Swiveled on driving pins 1 is an equalizer 14 with pins 15. Swiveled on pins 15 are coupling frames 2, 4, 2 carrying rollers 6 bearing against guides 5 carried by a coupling member secured to the driven shaft. If the two driving frames do not close up against guides 5 at the same time, pins 1 rotate a certain distance ahead. The equalizer swivels on pins 1 and distance 16 is thus added between the two driving frames until they close up and drive together.

A preferred form of my coupling is shown in Figs. 5 and 6. Secured to a shaft 17 is coupling member 18 carrying driving pins 1. Two pair of driving rods are swiveled with one end on the driving pins 1, and pivotally inserted between the other ends 3 of the driving rods are connections 4. On pins 3 of the driving frame are rollers 6 bearing against yieldable guides 5 carried by coupling member 19 secured to a shaft 20. The length of connection 4 may be changed by a manipulation of nuts 21 to adjust the running fit between rollers 6 and guides 5. The driving rods 2 may be of a yieldable form to cushion blows and sudden changes in the power transmission. A preferred form of an equalizer between the two driving frames for this form of the coupling is shown in Figs. 7 and 8. The equalizer is swiveled on driving pin 1 and has the form of two eccentric disks 22 with centres 15. The driving rods 2 swiveled on said eccentric disks are provided with spherical bushings 23 to allow the driving rods 2 and the shafts a limited universal movement.

In Figs. 9 and 10 another form of my coupling with two driving frames is shown. The structural part of each driving frame shown in Fig. 9 is different. The cross section Fig. 10 shows in its lower part a section through the driving pins of the driving frames, and in its upper part a section through one of the driving frames engaging driven pins secured to a driven coupling member. Secured to a hollow shaft 24 is a coupling member 25 carrying driving pins 1. Two pair of driving rods 2 are swiveled with one end on the pins 1, having inserted between the other ends connections 4. In one of the driving frames connection 4 is provided with extensions 26 engaging slidably bearings 27 carried by a coupling member 28 secured to and revolving with shaft 29. In the other driving frame the connection 4 is provided with extensions 30. Suitable slots in extensions 30 engage slidably pins 31 carried by coupling member 28 secured to shaft 29.

The connection in both driving frames between pins 3 and extensions 26 and 30 have the form of spring beams, yielding to any power transmitted by the coupling. This yield also acts as an equalizer between the driving frames, it cushions blows and inequalities in the power transmission.

This form of coupling has a very small backlash. In electric drives exposed to violent shocks the combination of the yield and small back lash in this form of the coupling reduces surging currents drawn from the power line. All rotating parts are balanced. Either coupling member may be suitably changed to carry the driving frame. To increase the yield in the power transmission the coupling members carrying the coupling may be of a yieldable form. The driving rods 2 also may be yieldable.

It will of course be understood, that the structure of the different forms of the coupling may otherwise be modified within the scope of the appended claims.

Having thus described my invention, I claim as new and desire to secure by Letters Patent:

1. In a flexible coupling of the character described the combination of a driving and a driven shaft, a coupling member with diametrically opposite driving pins carried by one of said shafts, two pair of parallel driving rods having one end of each rod swiveled on said driving pins and a connection inserted between the other ends, each pair of driving rods and its connection forming a driving frame revolving with said one shaft, means provided on the driving frame to engage and to drive slidably coupling members secured to and revolving with the other shaft.

2. In a flexible coupling of the character described the combination of a driving and a driven shaft, a coupling member with diametrically opposite driving pins carried by one of said shafts, two pair of parallel driving rods having one end of each rod swiveled on said driving pins and an adjustable connection inserted between the other ends, each pair of driving rods being yieldable and forming together with its connection a yieldable driving frame revolving with said one shaft, means provided on the driving frame to engage and to drive slidably coupling members secured to and revolving with the other shaft.

3. A flexible coupling of the character described comprising a driving and a driven shaft, a coupling member with diametrically opposite driving pins secured to one of said shafts, equalizer bushings swiveled on said driving pins, two pair of driving rods having one end of each rod swiveled on said equalizer bushings and a connection pivotally inserted between the other ends of each pair, the two pair of driving rods and its connection forming two driving frames revolving with said one shaft and coupling member, and means provided to slidably engage and to drive coupling members secured to and revolving with the other shaft.

4. A flexible coupling of the character described comprising a driving and a driven shaft, a coupling member carrying diametrically opposite driving pins secured to one of said shafts, two pair of driving rods having one end of each rod swiveled on said driving pins and a yieldable connection pivotally inserted between the other ends, the two pair of driving rods and its yieldable connection forming two yieldable driving frames revolving with said one shaft and coupling member, and extensions provided on said flexible connection of the two driving frames to slidably engage and to drive coupling members secured to and revolving with the other shaft.

ARTHUR LANZ.